(12) United States Patent
Rhule

(10) Patent No.: US 11,046,573 B2
(45) Date of Patent: Jun. 29, 2021

(54) BEVERAGE MIXING AND DISPENSING APPARATUS

(71) Applicant: Patrick Lenox Rhule, London (GB)

(72) Inventor: Patrick Lenox Rhule, London (GB)

( * ) Notice: Subject to any disclaimer, the term of this patent is extended or adjusted under 35 U.S.C. 154(b) by 0 days.

(21) Appl. No.: 16/472,518

(22) PCT Filed: Dec. 27, 2017

(86) PCT No.: PCT/GB2017/053897
§ 371 (c)(1),
(2) Date: Jun. 21, 2019

(87) PCT Pub. No.: WO2018/115910
PCT Pub. Date: Jun. 28, 2018

(65) Prior Publication Data
US 2019/0315616 A1    Oct. 17, 2019

(30) Foreign Application Priority Data

Dec. 23, 2016 (GB) ..................................... 1622113

(51) Int. Cl.
*B67D 3/00*    (2006.01)

(52) U.S. Cl.
CPC ......... *B67D 3/0096* (2013.01); *B67D 3/0012* (2013.01); *B67D 3/0029* (2013.01);
(Continued)

(58) Field of Classification Search
CPC .. B67D 3/0096; B67D 3/0012; B67D 3/0029; B67D 3/0041; B67D 2210/00031; B67D 2210/00163; F16K 31/58; A47J 31/46
(Continued)

(56) References Cited

U.S. PATENT DOCUMENTS 1,982,750 A * 12/1934 McCue ................ B67D 1/0082
222/129.3
2,073,112 A * 3/1937 Lindinger ............... F16K 31/58
251/333
(Continued)

FOREIGN PATENT DOCUMENTS

CN    202801280 U    3/2013
CN    204378946 U    6/2015
(Continued)

OTHER PUBLICATIONS

International Search Report and Written Opinion of International Application No. PCT/GB2017/053897 dated Mar. 10, 2017, 17 pages.

*Primary Examiner* — Lien M Ngo
(74) *Attorney, Agent, or Firm* — Fay Sharpe LLP

(57) ABSTRACT

A shaked beverage dispensing apparatus (1) comprising: a beverage dispenser (2); a housing (30), including a cavity (32) for holding the beverage dispenser (2), a weighted cork (18) which blocks an outlet (29) from the beverage dispenser, a first nozzle (12) extending from the outlet (29), a second nozzle (27) which is movable in relation to the first nozzle (12), a lifting bracket (26) attached to or abutting the second nozzle (27), a lifting mechanism (41) attached to one end of the lifting bracket (26), a lifting rod (28), an outer funnel (35) at least partly beneath the first and second nozzles, the lifting bracket 26 capable of being raised by the lifting mechanism (41) to raise the second nozzle (27), causing the lifting rod (28) to dislodge the weighted cork (18) allowing beverage to flow from the outlet (29) and through the first and second nozzles, and thence through the outer funnel (35), the outer funnel (35) remaining fixed during the movement of the second nozzle (27).

17 Claims, 17 Drawing Sheets

(52) U.S. Cl.
CPC .. *B67D 3/0041* (2013.01); *B67D 2210/00031* (2013.01); *B67D 2210/00163* (2013.01)

(58) Field of Classification Search
USPC ...... 222/23, 24, 129.1–129.4, 510, 511, 514, 222/182, 453, 464.1
See application file for complete search history.

(56) References Cited

U.S. PATENT DOCUMENTS

| | | | | |
|---|---|---|---|---|
| 5,931,343 A | * | 8/1999 | Topar | A47J 31/401 222/129.3 |
| 2006/0086137 A1 | | 4/2006 | Brand et al. | |

FOREIGN PATENT DOCUMENTS

| | | |
|---|---|---|
| EP | 2085352 | 8/2009 |
| GB | 448756 A | 6/1936 |
| NL | 93 389 C | 2/1960 |

* cited by examiner

BEVERAGE MIXING AND DISPENSING APPARATUS

BACKGROUND OF THE INVENTION

Technical Field

This invention relates to a beverage mixer and, more particularly, to a mixing and dispensing apparatus for producing a mixed beverage.

Prior Art

Many types of arrangements are known in the prior art for mixing beverages such as milkshakes and similar drinks. The dispensing arrangements of such drink mixers normally have a dispensing nozzle and a valve associated therewith for controlling the dispensing operation. Manually controlled dispensing arrangements, wherein an operator manually controls the dispensing valve, have some serious disadvantages associated therewith. The operator should maintain the dispensing valve open for a sufficient time period to provide or serve the correct quantity of beverage in each cup. Therefore, it would be advantageous to have a dispenser that is automated and consistently delivers the desired amount of beverage. Many consumers of milkshakes or malts prefer that they be made from hard ice-cream and be of medium to thick consistency. As a result, the mixing of this type of milkshake has created many problems with the existing prior art milkshake machines.

Milkshake machines known in the prior art consist of an electric motor, shaft, and mixing disc. This device is supported on a stand or hangs from a wall bracket. Making a hard ice-cream milkshake involves holding a metal cup under the revolving shaft and disc while manually manipulating the cup vertically and in a stirring motion which achieves only a partial mixture. This mixture may contain foreign matter as a result of the mixing head coming in contact with the sides of the cup. This method is time-consuming, inefficient and sometimes aggravating in general, milkshake mixers known in the prior art are of a rather basic design. Such mixers provide no entertainment to the user and thus do not increase the likelihood of their use. A mixer with an appealing design could make the use thereof more likely, as the owner gets more pleasure and fulfillment from their mixer and would be inclined to use it more frequently.

Accordingly, a need remains for a mixing and dispensing apparatus in order to overcome the above-noted shortcomings. The present invention satisfies such a need by providing an apparatus that is easy to use, novel and eye-catching in design, entertaining and results in time savings.

Such a mixing and dispensing apparatus allows a user to make a milkshake beverage of any desired flavor and texture, thus increasing its appeal. The apparatus is particularly appealing to individuals with children, who will find it most entertaining when the apparatus "talks' to them while mixing their drink.

BRIEF SUMMARY OF THE INVENTION

In view of the foregoing background, it is therefore an object of the present invention to provide a mixing and dispensing apparatus. These and other objects, features, and advantages of the invention are provided by a housing that has a place to receive a removable dispenser with mixing blades inside and a weighted cork, this dispenser is removable for cleaning purposes, it receives and mixes a the various ingredients of the beverage and a unique mechanism by which the mixed beverage which is dispensed through a 1st nozzle attached to a plastic molded neck on the underside of the dispenser, of which molded neck has the 1st nozzle fitted over the top, and then through a 2nd removable spoked nozzle which sits in a lifting bracket frame remaining in the base housing, of which a spoke of the second nozzle pushes the weighted cork inside the removable dispenser upward, dislodging the dispenser aperture and liquid is passed through the 1st nozzle, through the 2nd removable nozzle which sits in the housing and partially within a passageway inside a removable funnel figurine, and then passes out of a part of the underside of the funnel figurine resembling cow udders.

The present invention includes a housing having an interior portion. The interior portion includes an upper section, a middle section, and a lower section. The upper section of the interior includes an upper partition platform beneath a cavity for accommodating a removable beverage dispenser. The platform has cut outs for the legs of the dispenser fit through. A removable beverage dispenser for holding and mixing ingredients. A base gear motor beneath the upper partition platform and the blender drive coupling on the upward facing side of the platform which receives the dispenser blade coupling on the underside of the removable dispenser.

The housing has a first compartment for supporting a container, and a second compartment positioned above the first compartment.

Mixing blades within the removable dispenser blends the beverage ingredients placed in the dispenser cavity.

The lifting of a weighted cork held within the dispenser selectively dispenses the mixed beverage from the upper section, this is caused to happen when activated by the control panels pour button, then the weighted cork within the dispenser is dislodged by a T spoke of this 2nd spoked nozzle being lifted by a bracket frame which holds the T spoked nozzle in the housing unit.

The bracket frame is lifted by a geared lifting mechanism in the housing unit behind the second compartment within the interior section beneath the upper partition platform, lifting the bracket frame upwards along with the 2nd T spoked nozzle.

The timed lifting mechanism lifts the bracket frame 2nd T spoked nozzle which the spoke then dislodges the weighted cork within the dispenser and transfers the mixed beverage from the upper section dispenser cavity through the 1st nozzle and 2nd T spoked nozzle, through a passageway within the removable cow funnel figurine and out of the underside of the removable cow funnel figurine and into the container.

A control assembly controls the variable speed motor and the timed lifting mechanism. The control assembly includes an audio apparatus for producing sound and switching on and off led lights.

The objects of the invention, along with the various features of novelty which characterize the invention, are pointed out with particularity in the claims annexed to and forming a part of this disclosure.

It is noted the purpose of the foregoing abstract is to enable the Patent and Trademark Office and the public generally, especially the scientists, engineers and practitioners in the art who are not familiar with patent or legal terms or phraseology, to determine quickly from a cursory inspection the nature and essence of the technical disclosure of the application. (The abstract is neither intended to define the invention of the application, which is measured by the claims, nor is it intended to be limiting as to the scope of the invention in any way.)

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 3:
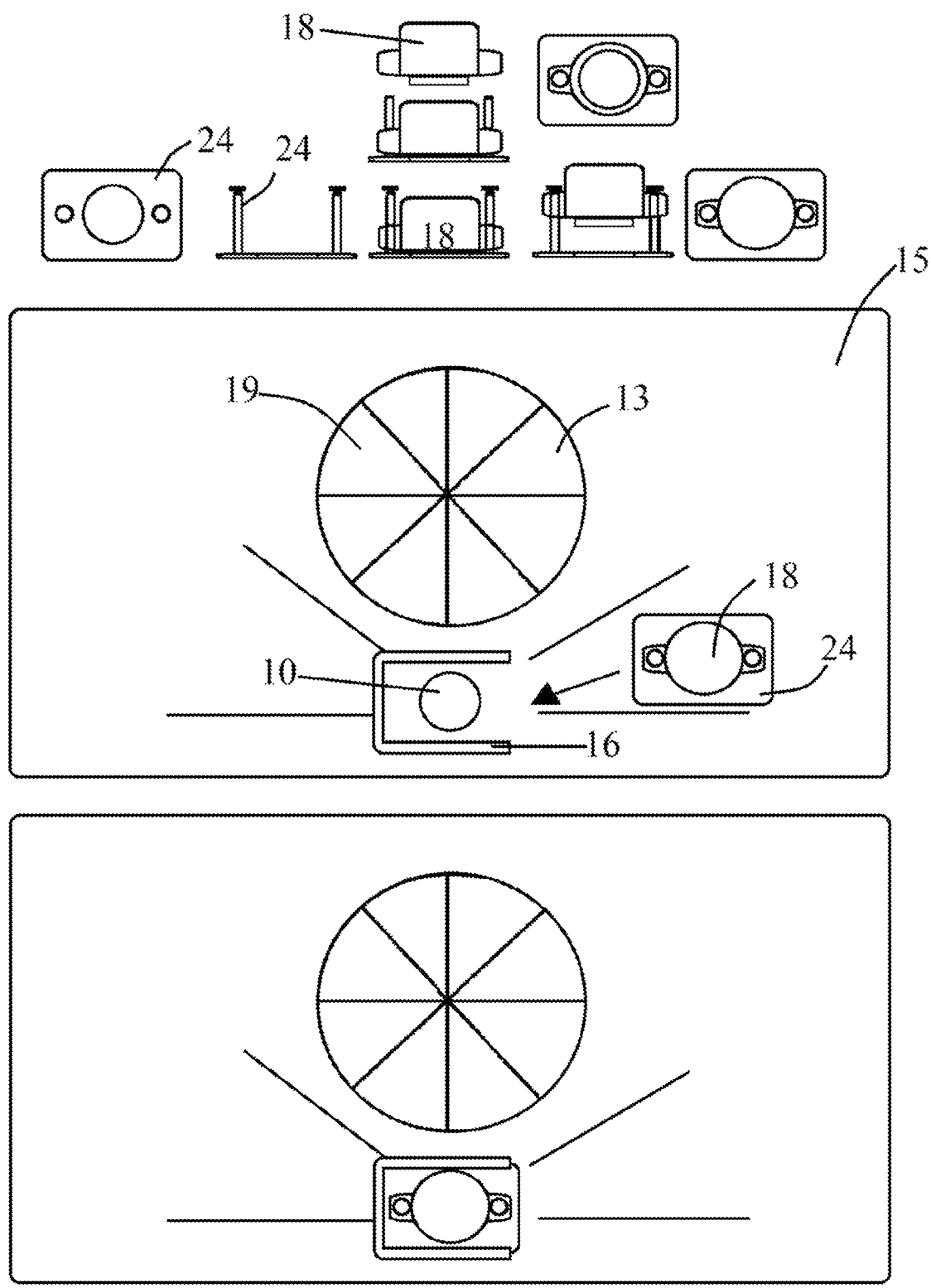
FIG. 3 is a birdseye view of the bottom wall of dispenser with mixing portion and molded plastic 3 sided frame around the dispenser aperture for holding in place the two shafted aperture plate which accommodates the weighted cork, and the bottom wall of dispenser without and then with the weighted cork in place.
Figure 3:
Figure 3:
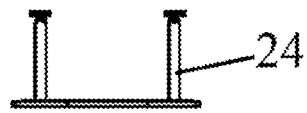
Figure 3:
Figure 3:
Figure 3:
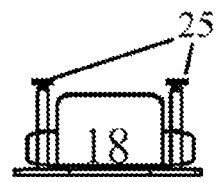
Figure 3:
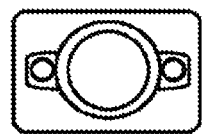
Figure 3:
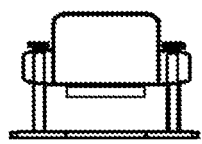
Figure 3:
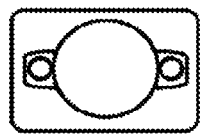

additional page for FIG. 3 shows: FIGS.

Figure 4:
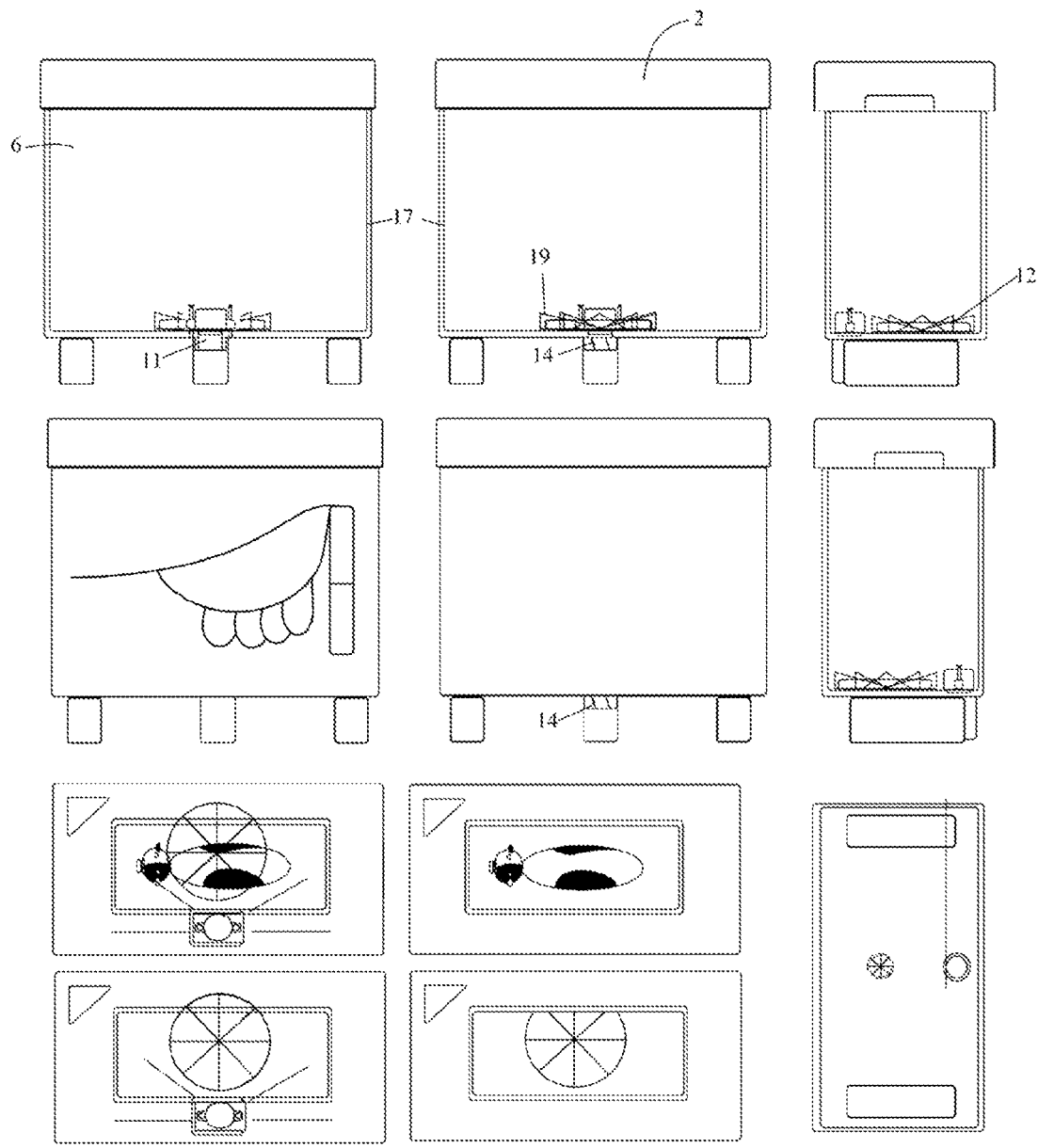

3a birdseye view of the two shafted aperture plate with stoppers in 3b side view of the two shafted aperture plate with stoppers in 3c side view of the weighted cork separate from the two shafted aperture plate 3d side view of the two shafted aperture plate with the weighted cork on 3e transparent side view of the two shafted aperture plate with the weighted cork on and stoppers on 3f birdseye transparent view of the two shafted aperture plate with the weighted cork on and stoppers in 3g transparent side view of the two shafted aperture plate with the lifted weighted cork on and stoppers on 3h birdseye view of the two shafted aperture plate with the weighted cork on and stoppers in FIG. 4 is a cross section of the removable dispenser from the front facing side, left and right side, top side and under side. (is a detailed view of the beverage dispenser from side beneath above and front)

Figure 5:
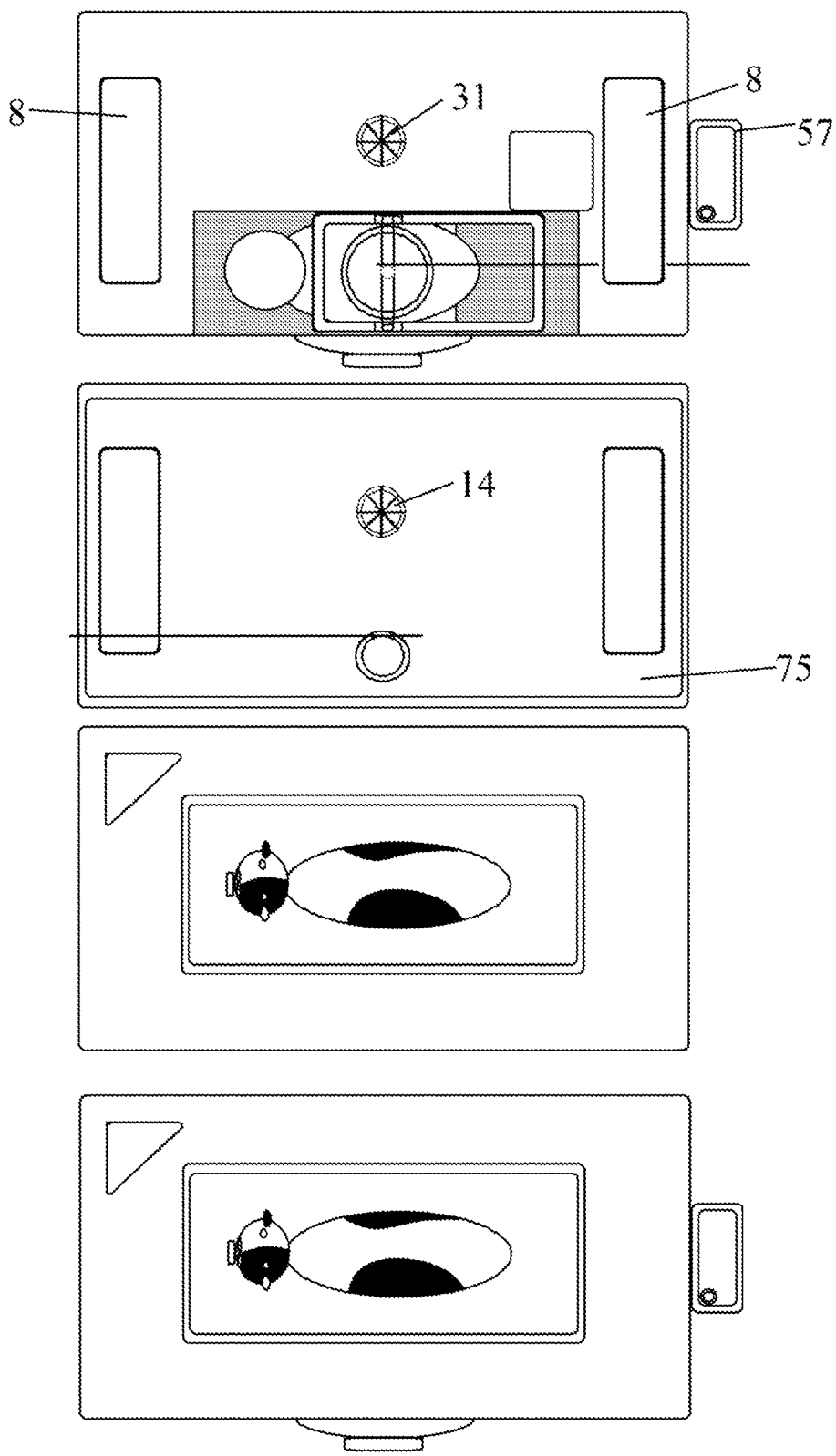

FIG. 5 is a birdseye view of the invention housing with dispenser removed, dispenser underside showing legs coupling and 1st nozzle, top of dispenser with lid member and triangle corner door opening for cleaning and alternative pouring purposes, and dispenser inside housing.

Figure 6:
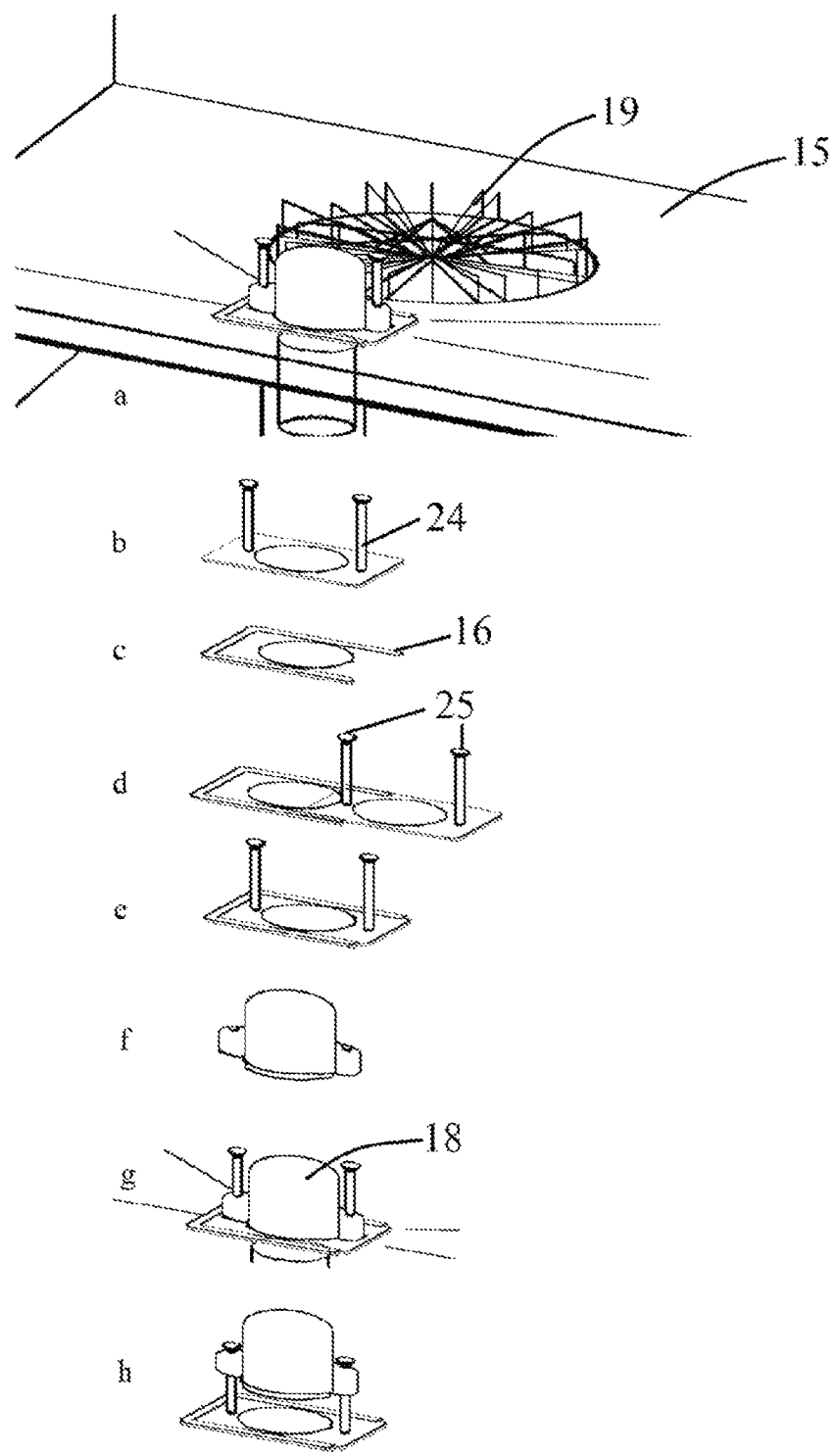
Figure 7:
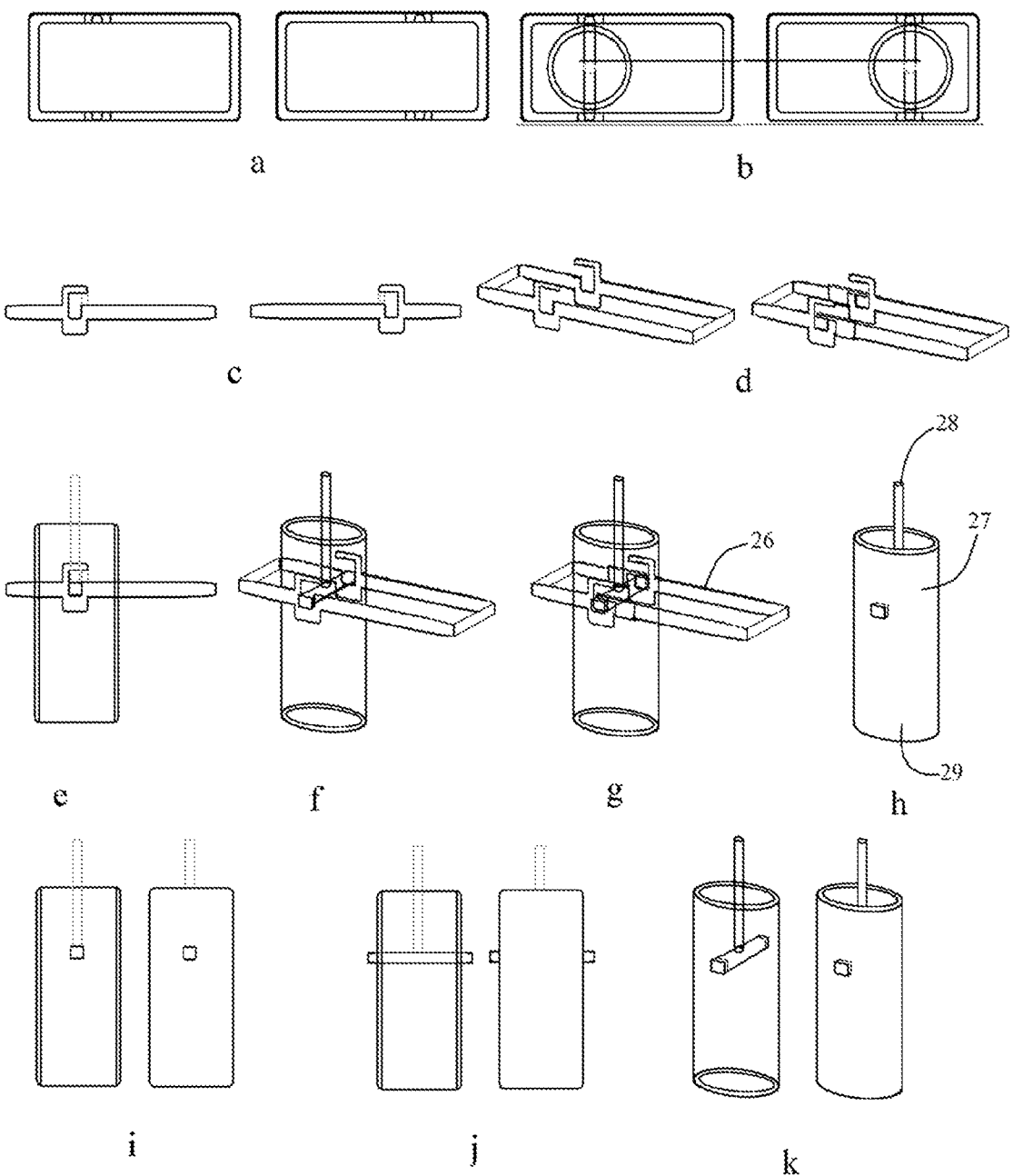
Figure 8:
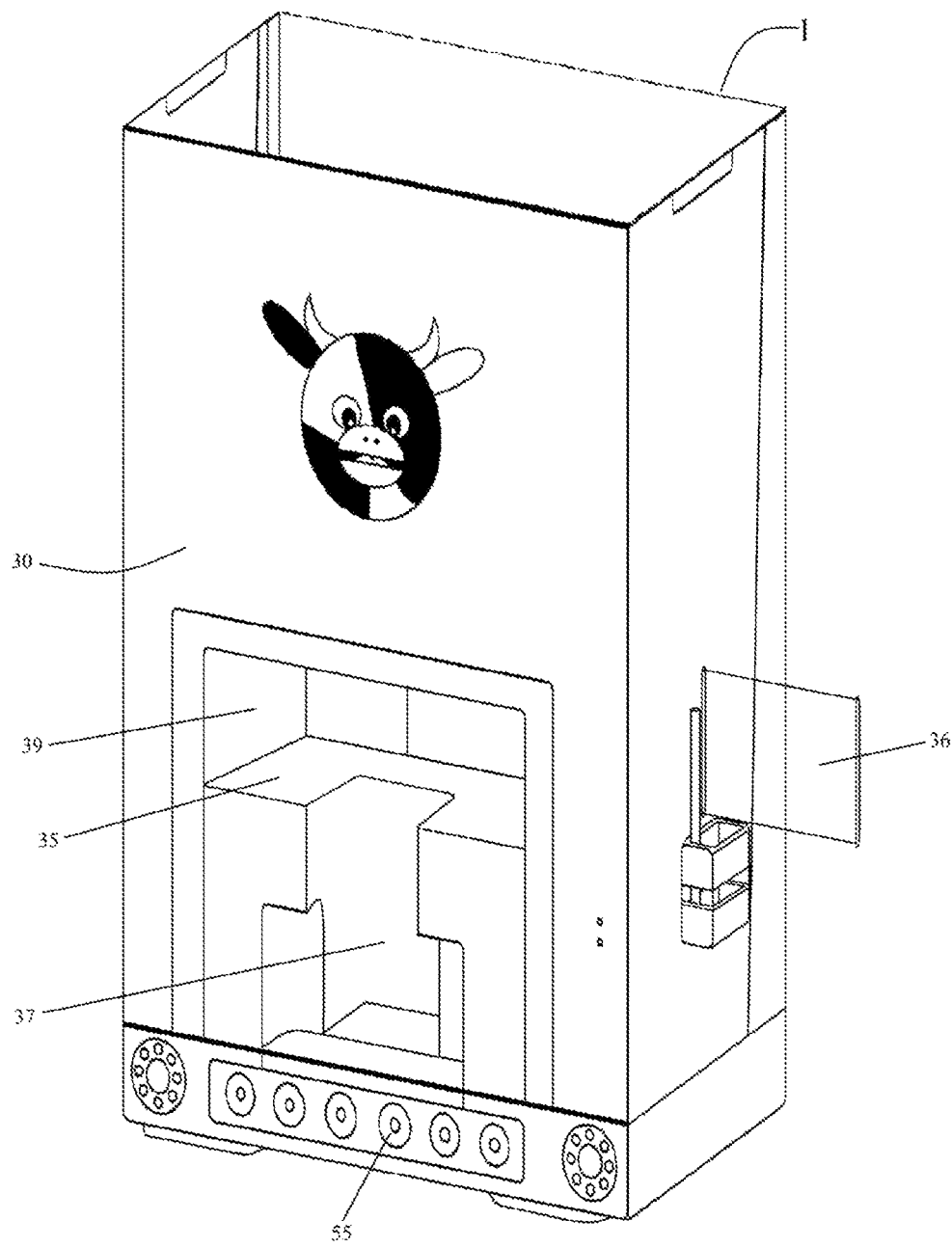

FIG. 6 is a 2d and 3d view of the two shafted aperture plate with stoppers, and with the weighted cork on the two shafted aperture plate. (is a detailed view of the bracket frame, T spoked 2nd nozzle, weighted cork and two shafted plate with aperture hole for guiding the weighted cork.

a 3d transparent view of bottom wall of dispenser with mixing blades and weighted cork in place b 3d view of two shafted aperture plate with stoppers on c 3d view of 3 sided plastic molded frame on the bottom wall d 3d view of 3 sided plastic molded frame on the bottom wall with two shafted aperture plate being slotted in place e 3d view of 3 sided plastic molded frame on the bottom wall with two shafted aperture plate in place f 3d view of weighted cork separate from aperture plate g 3d view of 3 sided plastic molded frame and aperture plate with weighted cork in place h 3d view of 3 sided plastic molded frame and aperture plate with lifted weighted cork FIG. 7 is various perspectives of the bracket frame, the T spoked nozzle and the weighted cork.

a aerial view of bracket frame two directions b aerial view of bracket frame with t-spoked nozzle in place two directions c side view of bracket frame with in two directions d two 3d views of bracket frame one to right with securing fasteners in place e side transparent view of bracket frame with t-spoked nozzle in place f 3d view of bracket frame with t-spoked nozzle and securing fasteners in place g 3d view of bracket frame with t-spoked nozzle in place h solid view of t-spoked nozzle i transparent and solid side view of t-spoked nozzle j transparent and solid side view of t-spoked nozzle showing lateral bar in transparent view k 3d transparent and solid view of t-spoked nozzle FIG. 8 is a view of the housing with the slide out perspex background scene holder partially pulled out of the housing.

Figure 9:
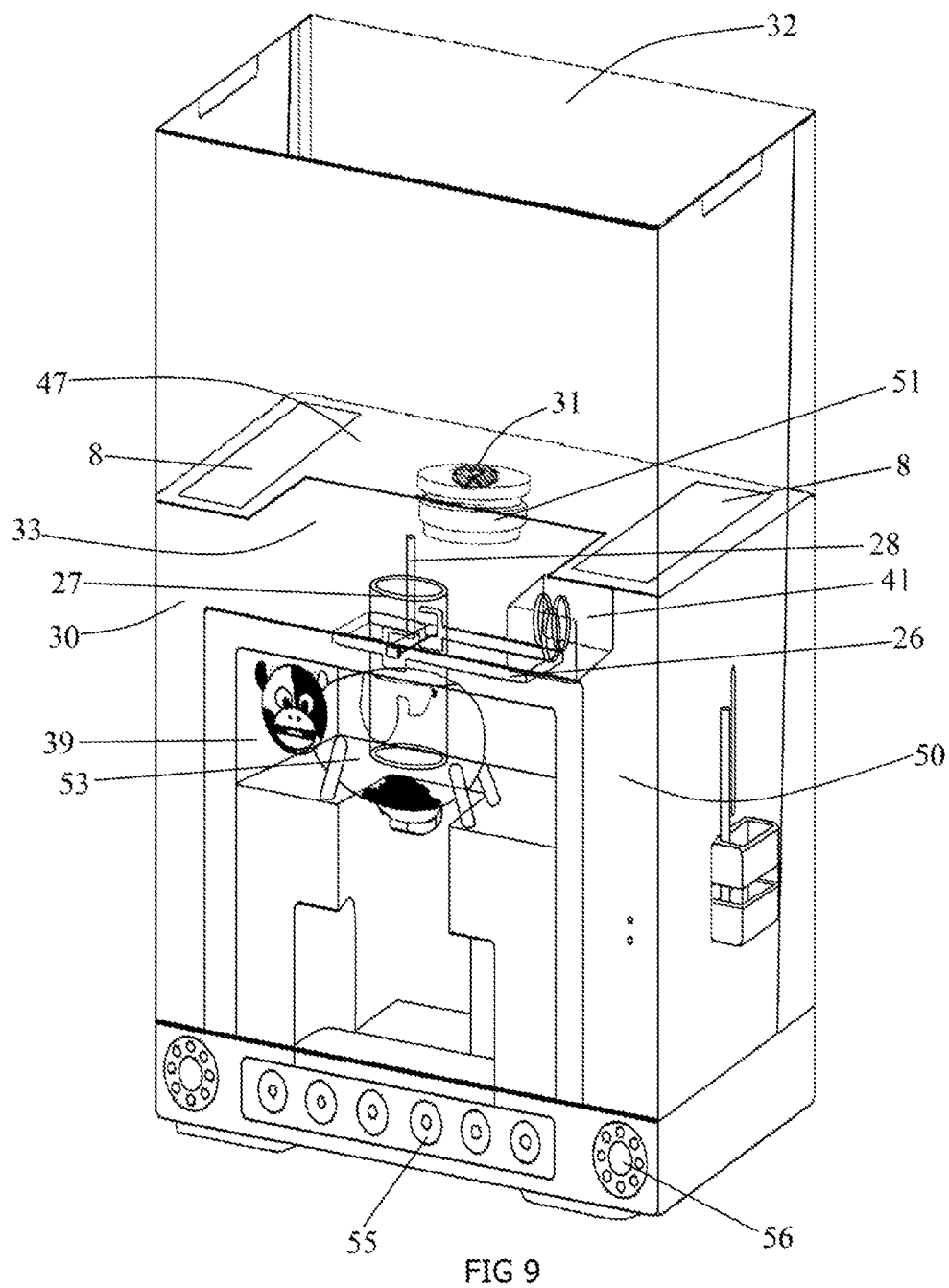

FIG. 9 is a cross section view of housing showing the cow funnel figurine in place on the second compartment portion platform beneath the bracket frame with the T spoked nozzle 27 sitting partially within the (funnel) cow figurine 53 and held in the fixings of the bracket frame 26.

Figure 10:
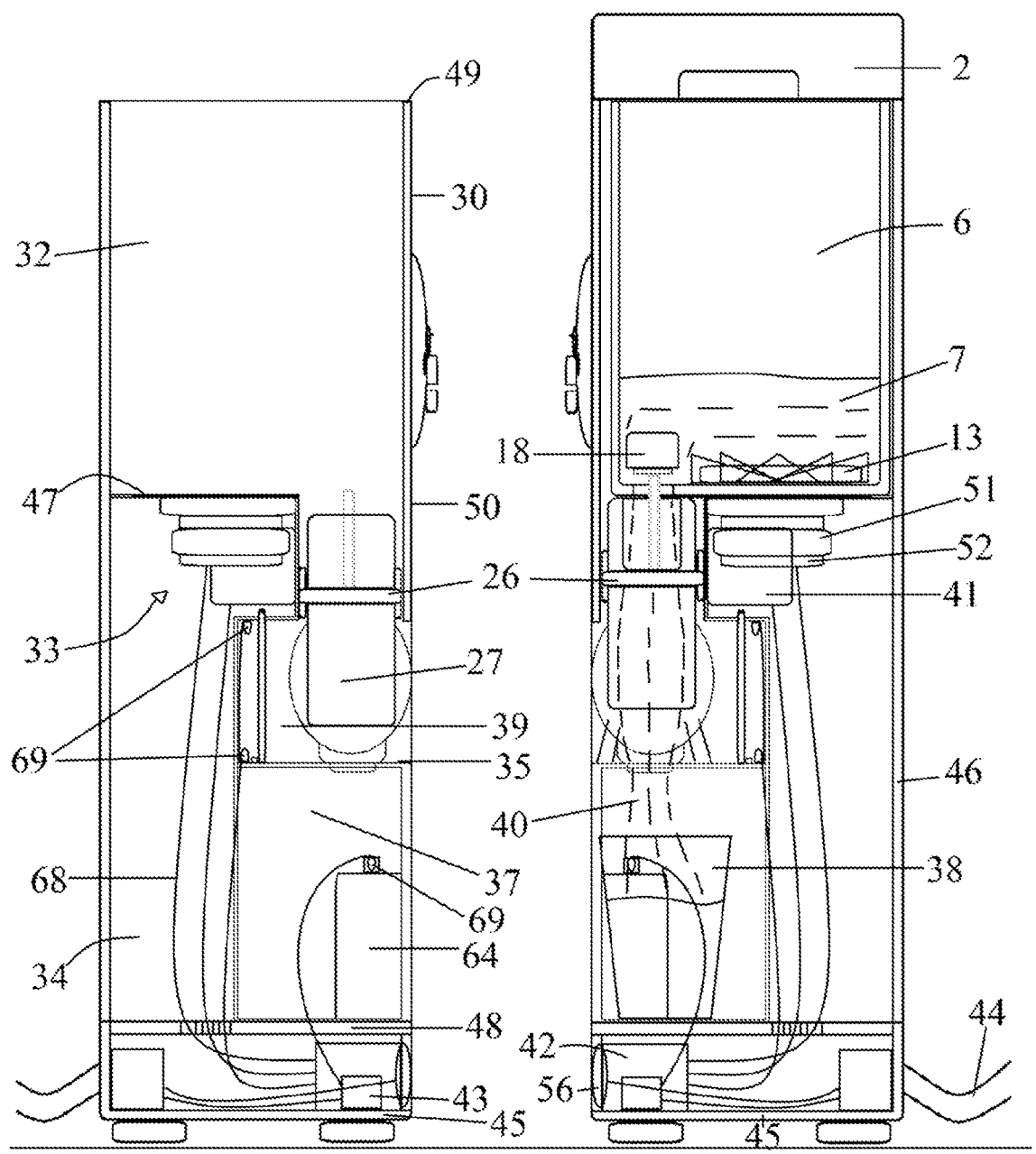

FIG. 10 is a two side perspective of invention A and B, A without and with dispenser in, and B showing the liquid passage from the dispenser through 1st and 2nd nozzle to the container.

Figure 1:
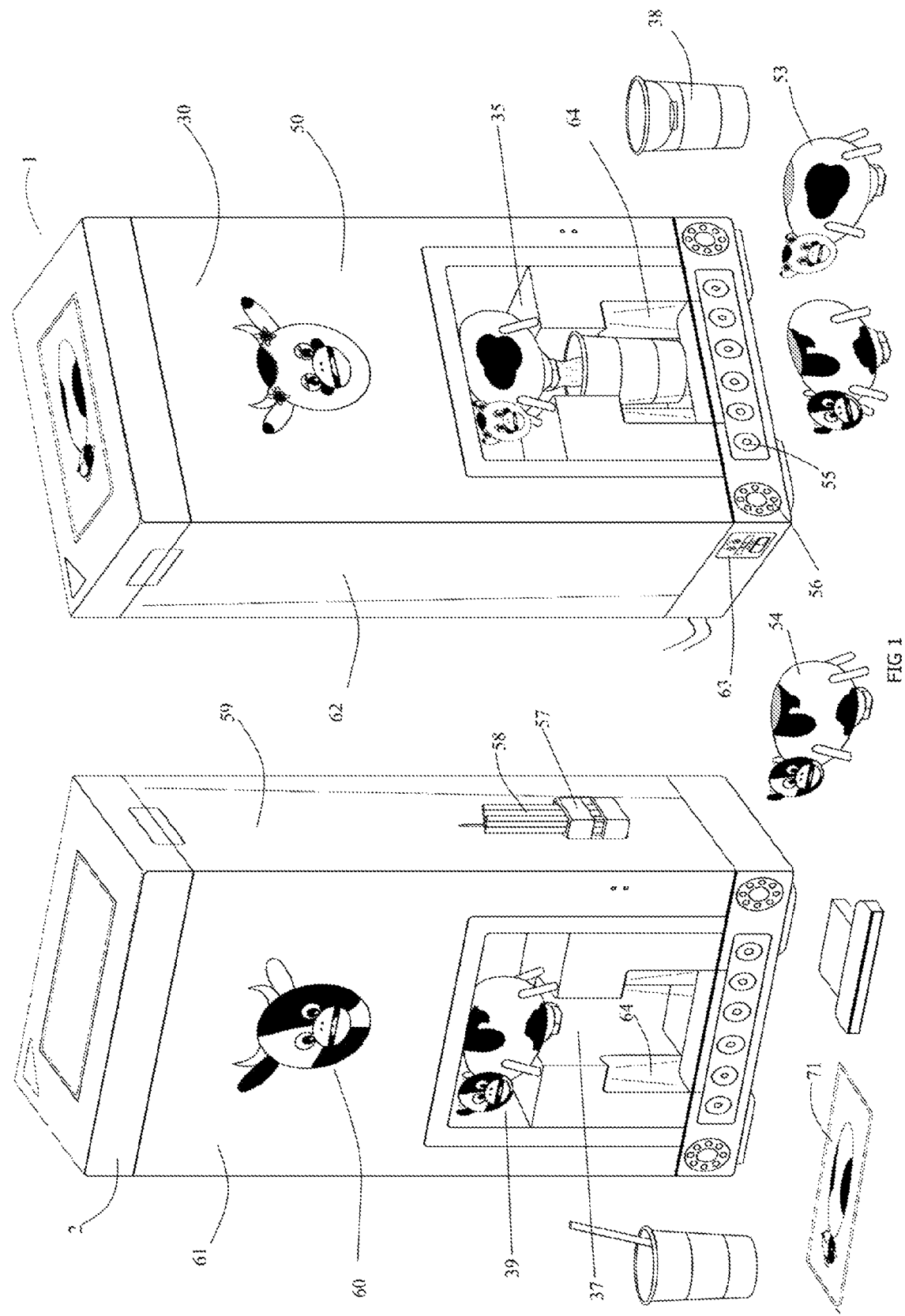
FIG. 1 is two perspective views showing the mixing and dispensing apparatus, in accordance with the present invention.
Figure 11:
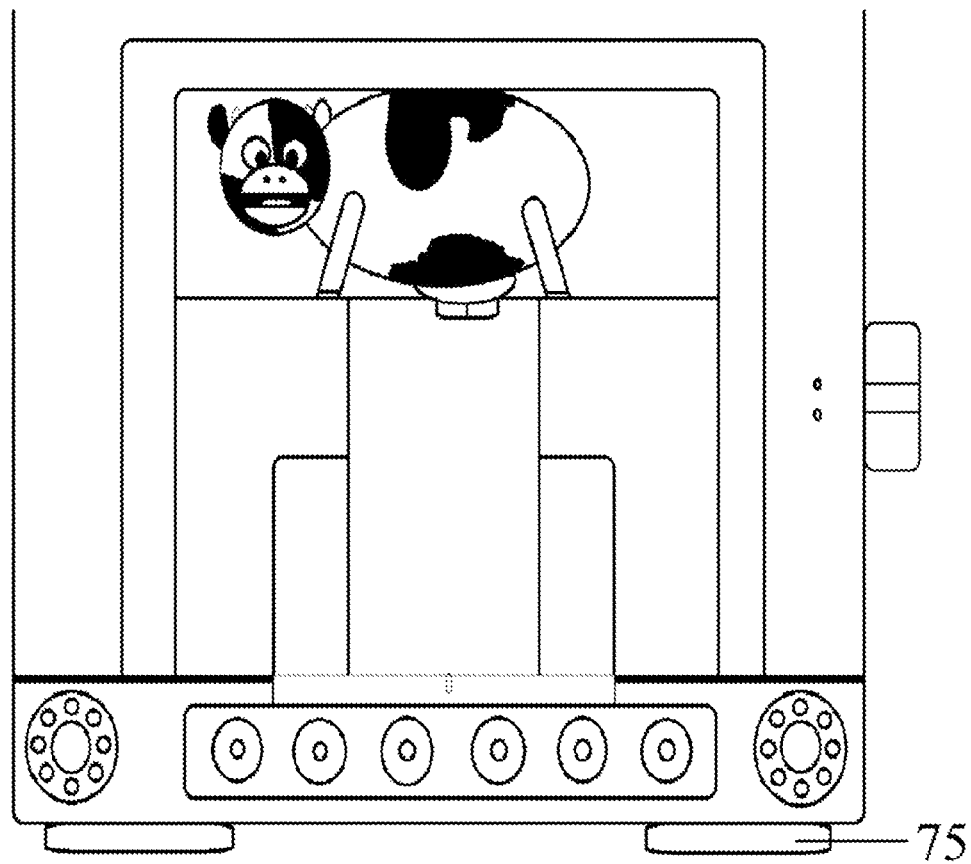
Figure 11:
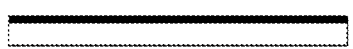
Figure 11:
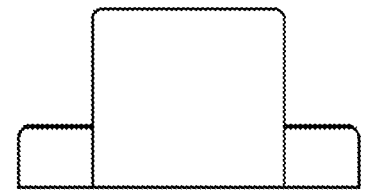
Figure 11:
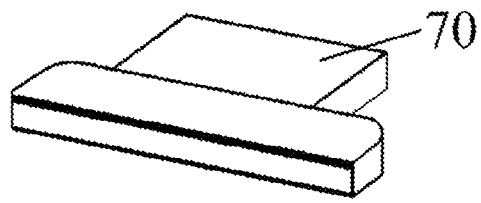
Figure 11:
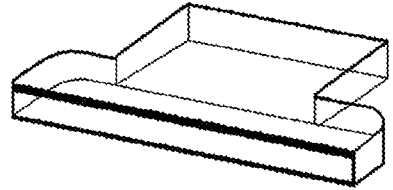
Figure 12:
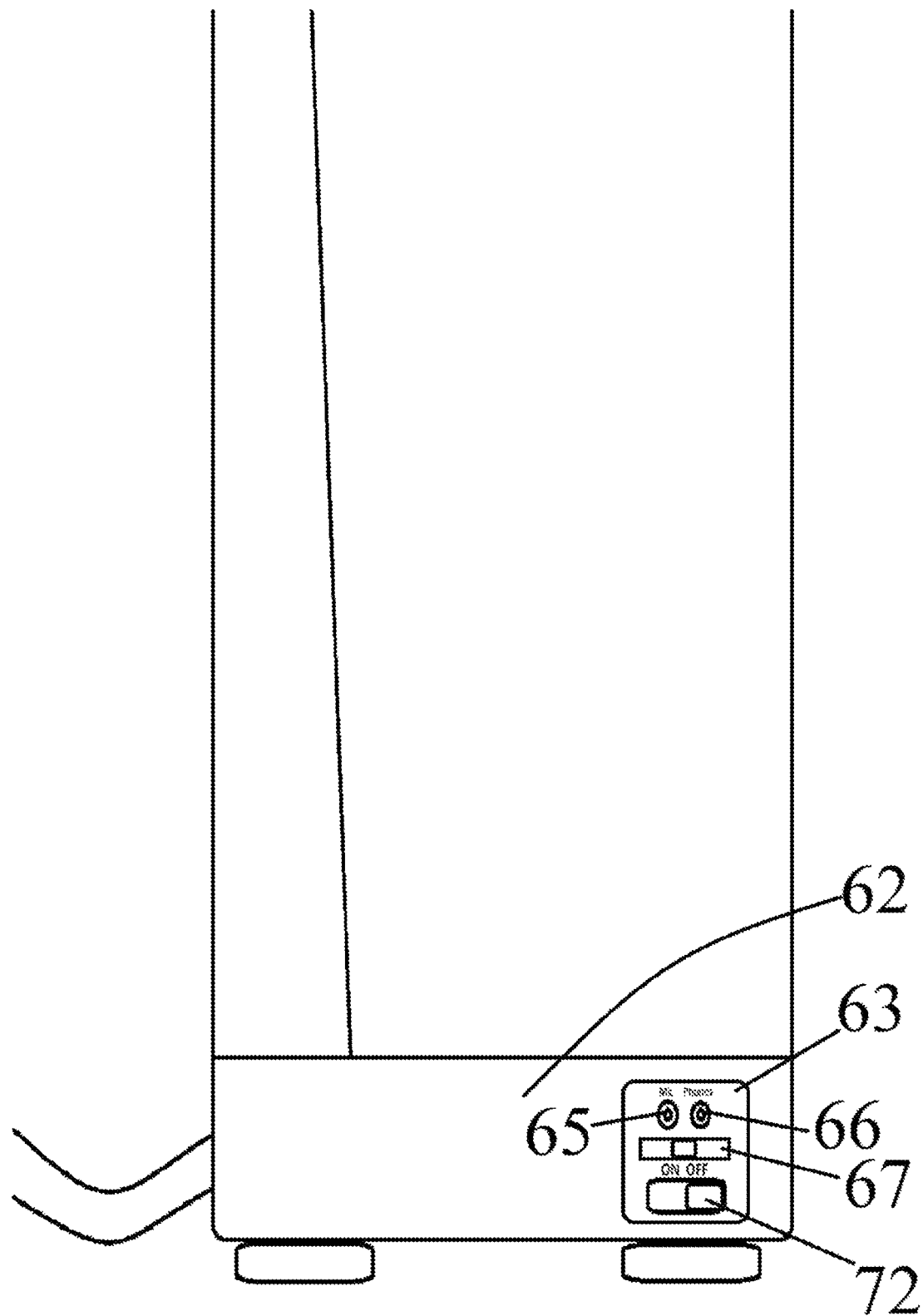

FIG. 11 is a view of the tray removed from its position on the apparatus housing a flat view of spillage tray removed from apparatus b aerial view of spillage tray removed from apparatus c 3d view of spillage tray removed from apparatus d transparent 3d view of spillage tray removed from apparatus with top mesh removed FIG. 12 is a side elevational view of the present invention shown in FIG. 1, showing the small side sound panel.

Figure 13:
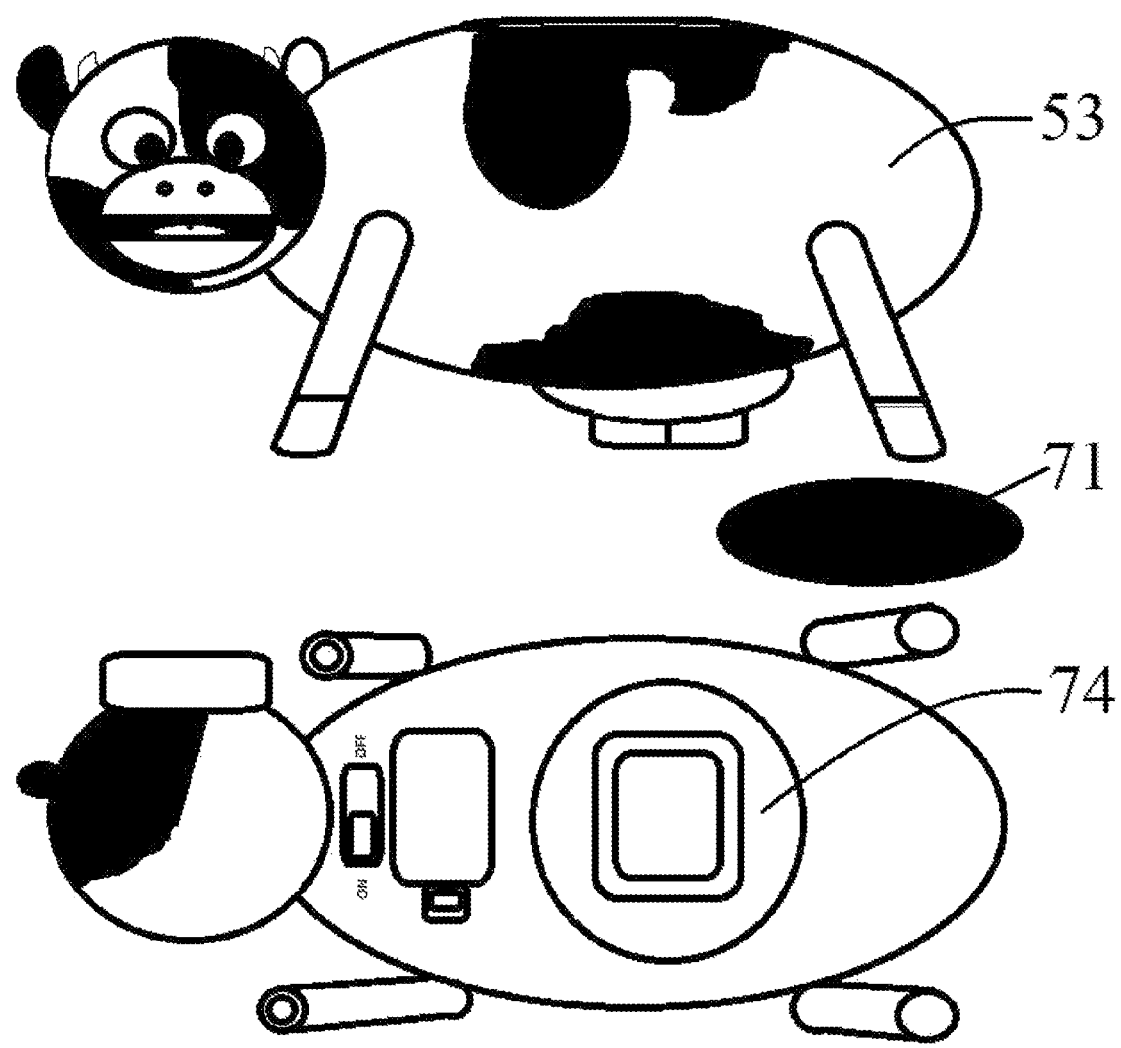

FIG. 13 removable funnel figurine showing side perspective with lid and underside with passageway to udder exit.

Figure 14:
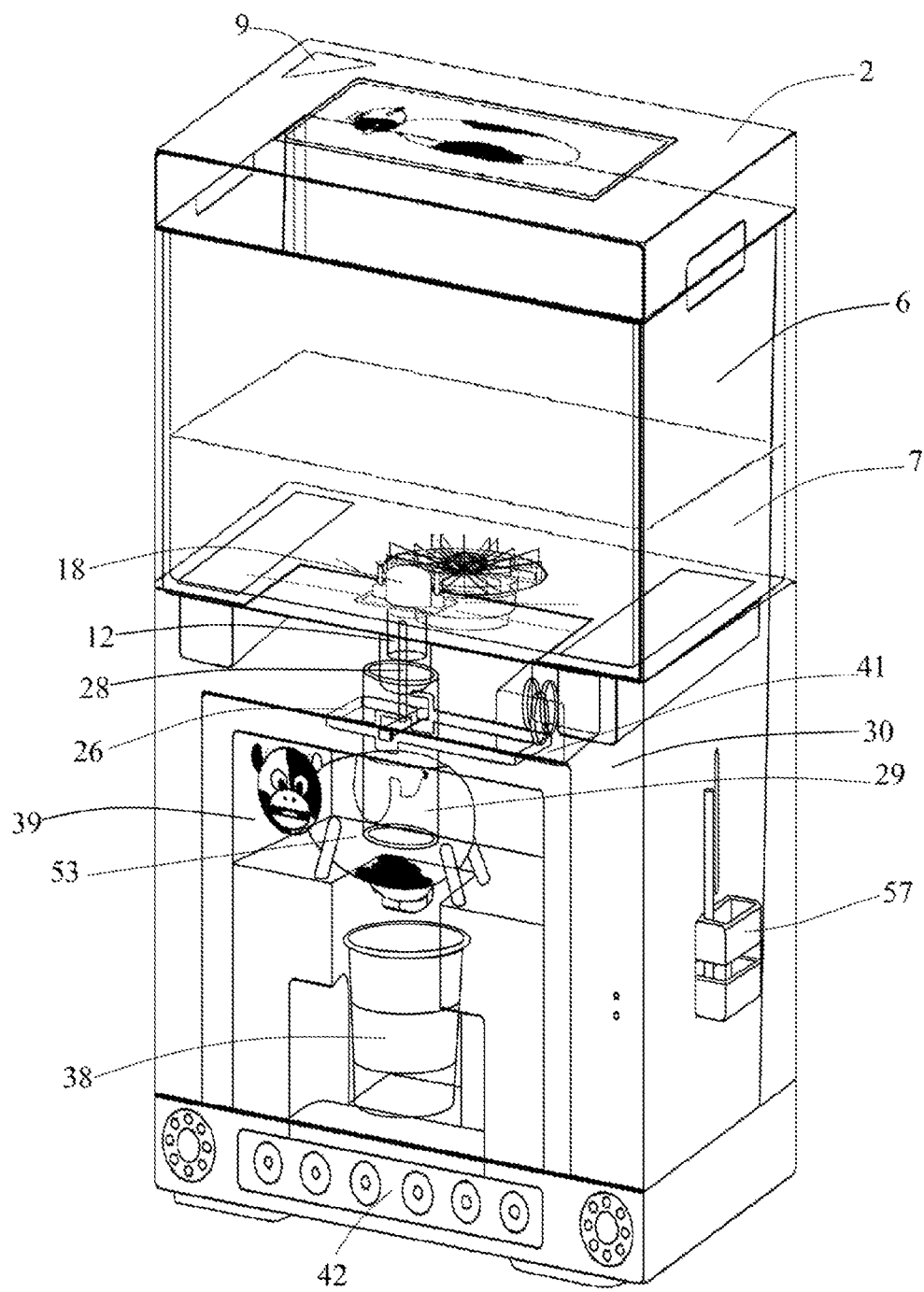

FIG. 14 is a cross section view of housing showing the cow funnel figurine and dispenser in place, with the mixing portion blade assembly, the weighted cork, the T spoked nozzle sitting partially within the cow figurine and held in the fixings of the bracket frame and the spoke of the nozzle positioned in the center of the dispenser 1st nozzle beneath the dispenser aperture and beneath the weighted cork.

Figure 15:
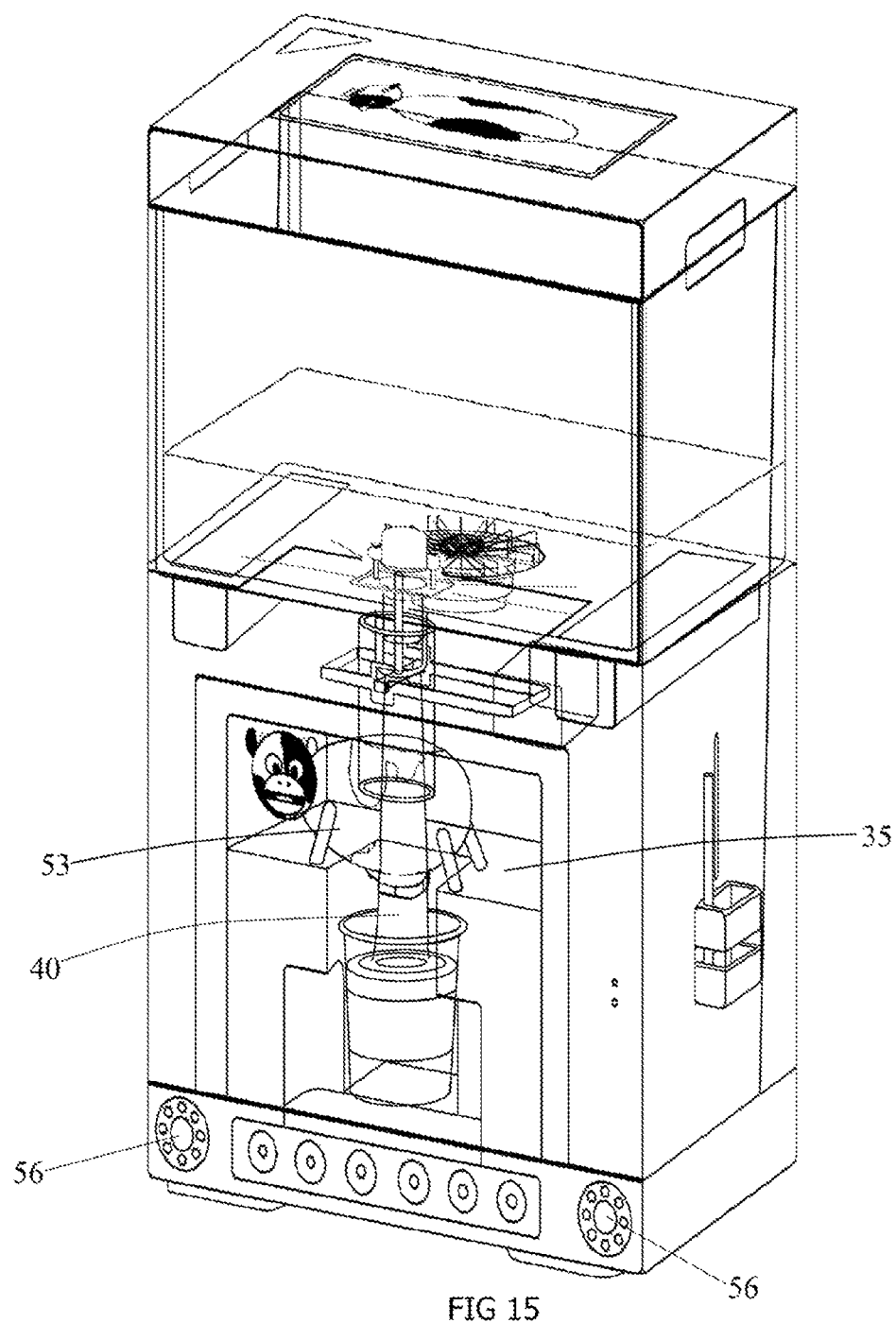
Figure 16:
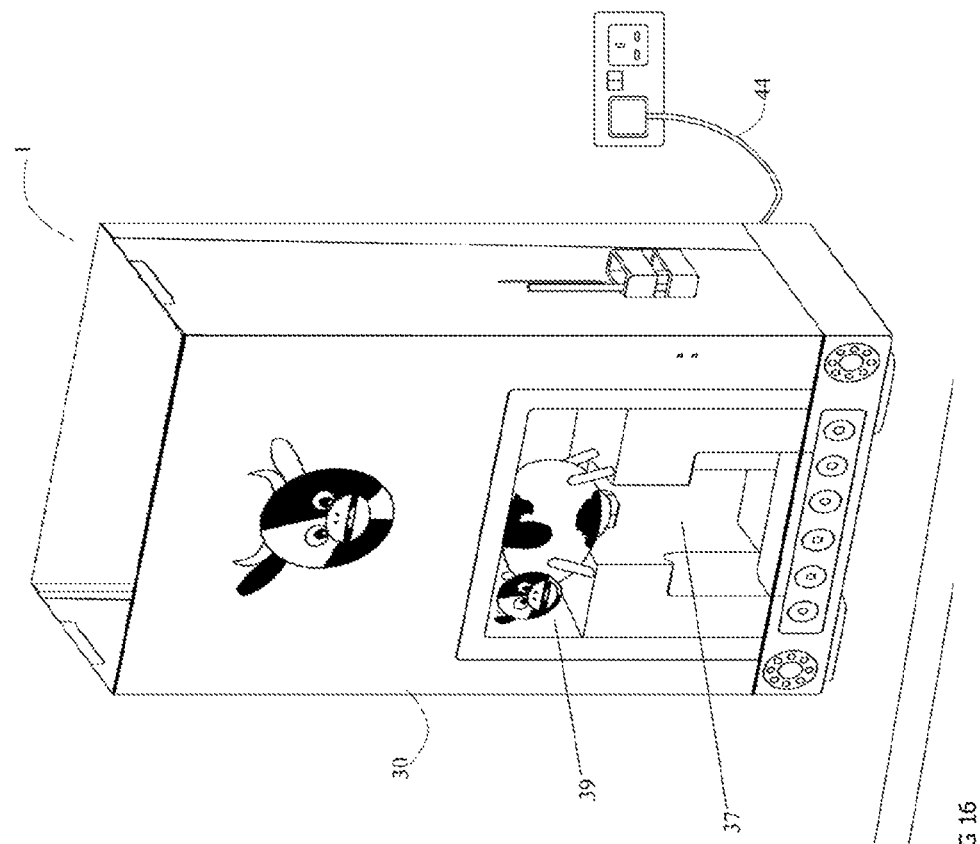
Figure 16:
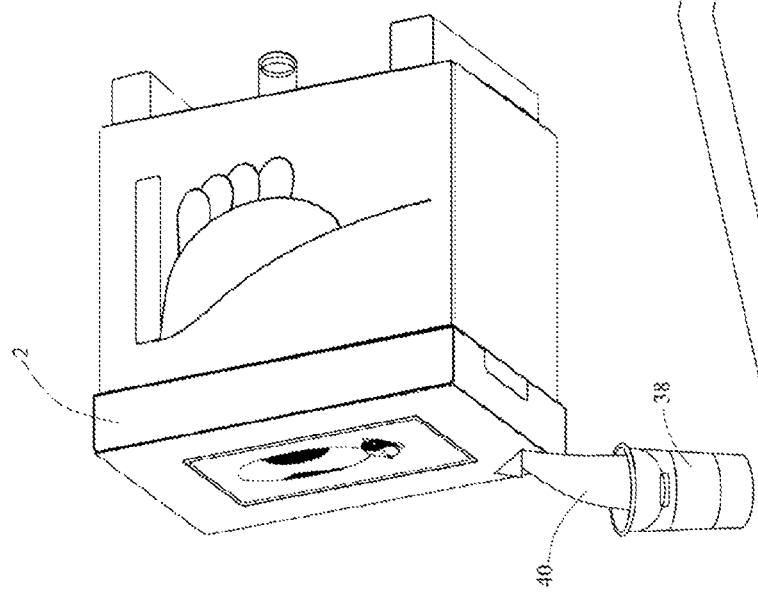

FIG. 15 is a cross section view of housing showing the dispenser in place with the T spoked nozzle sitting partially within the cow funnel figurine and being lifted in the fixings of the bracket frame by the lifting mechanism 41, and the T spoked nozzle spoke dislodging the weighted cork and freeing the beverage from the dispenser with the mixing portion blade assembly spinning to assist the dispersing of the beverage through the 1st nozzle, through the 2nd T spoked nozzle, and out of the udder section of the funnel figurine into the container FIG. 16 Shows the usage of the corner pouring door for pouring milkshakes outside of the dispenser and also for cleaning purposes.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-16 by the reference numeral 1 and is intended to provide a mixing and dispensing apparatus. It should be understood that the apparatus 1 may be used to mix many different types of milkshake beverages and should not be limited to mixing beverages of only one flavor or texture.

Referring initially to FIGS. 10 and 1, the apparatus 1 includes a housing 30 that has an interior portion including an upper section 32, a middle section 33, and a lower section 34. The upper section 32 of the interior portion 33 defines a cavity 32 for holding a removable beverage dispenser 2 for mixing beverage ingredients 7. The housing 30 further has a first compartment portion 37 for supporting a container 38. The housing 30 further has a second compartment portion 39 positioned above the first compartment portion 37.

Referring to FIG. 10, the housing 30 includes a bottom wall 45 and a peripheral wall 46 attached thereto and extending upwardly from the bottom wall 45 for defining an interior portion of the housing 30. The housing 30 also includes an upper partition platform 47 and a lower partition wall 48 that each extend between portions of the peripheral wall 46. The upper partition platform 47 is positioned between the upper section 32 and the middle section 33. The lower section 34 is positioned between the middle section 33 and the lower section 34.

An upper edge 49 of the housing peripheral wall 46 defines an opening into the upper section 32 for accommodation the removable dispenser 2. The upper partition platform 47 is positioned substantially below an upper edge 49 of the peripheral wall 46 defining the upper section 32. The lower partition wall 48 is positioned proximate to the bottom wall 45 defining the lower section 34 of the housing 30. The middle section 33 of the housing 30 is preferably located between the upper partition platform 47 and lower 48 partition walls.

Still referring to FIG. 10, the first compartment portion 37 extends through a front side 50 of the housing 30 and into the second compartment portion 39. The lower partition wall 48 forms a lower boundary of the first compartment. The second compartment portion 39 extends through the front side 50 into the upper section 32 of the housing 30, and may be positioned adjacent to and above the first compartment 37. Of course, the first compartment portion 37 may have surfaces 64 that may be illuminated via led lights 69, such as when the shake is done pouring and the container 38 is ready to be removed from the first compartment 37 as is well known to a person of ordinary skill in the art.

Referring to FIGS. 4, 5, 9 and 10, a mixing apparatus blender drive Coupler/clutch 31 is positioned in the interior of the housing 33 incorporated in the upper partition platform 47 for attaching to the removable dispenser coupling 14 for blending the beverage ingredients 7 that are placed in the dispenser cavity 6.

Referring to FIGS. 4, 9 and 10 A spoked nozzle 27 is positioned in the bracket frame 26 in the second compartment 39 of the housing 30 and selectively receives the ingredients 7 of the beverage 40 after they have been mixed by the mixing portion 13 in the cavity 6 of the dispenser 2.

Referring to FIGS. 9 and 10 A lifting mechanism 41 is positioned in the interior of the housing 33, in the middle section 33, for assisting the dispensing of the mixed beverage by lifting the spoked nozzle 27 and dislodging the dispensers weighted cork 18.

Referring to FIGS. 2, 3, 4, 5 and 10 The removable mixing dispenser 2 includes a mixing portion 13 and coupling 14 on the underside 75. The removable dispenser 2 bottom wall 15 has an aperture 10 descending therethrough such that the upper 32 and second compartment 39 sections and first compartment 37 are in fluid communication with each other. Two legs 23 on the underside of the dispenser 75 allows the dispenser 2 to be sat on counter tops when adding ingredients 7 to the dispenser 2 when it is removed from the housing 30.

Referring to FIGS. 3 and 4 The mixing portion 13 is positioned in the removable dispenser cavity 6 at a location on the upward facing side of the bottom wall 15 inside the removable dispenser 2.

Referring to FIG. 10 The dispenser 2 rests upon the upward facing side of the housings upper partition platform 47 when it is placed inside the housing 30.

Referring to FIG. 3 A weighted cork 18 fits onto two shafts of the removable aperture plate 24, and slides up and down the guide shafts, of the two shafted aperture plate 24. This plate slides into the three sided molded aperture plate holding frame 16 on the bottom wall inside the dispenser 15.

Figure 2:
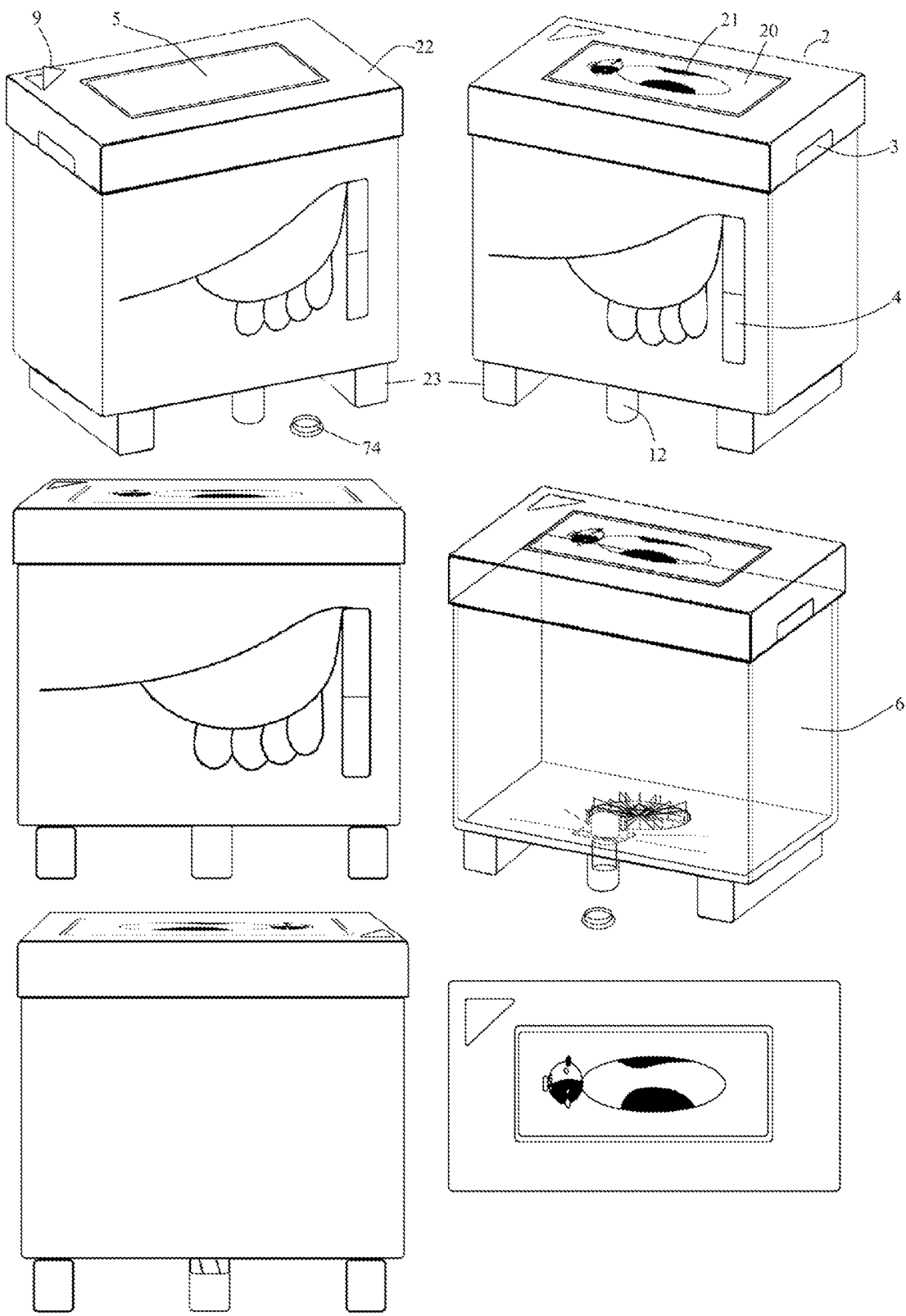
FIG. 2 is five solid perspectives of the removable dispenser and one plan view

Referring to FIG. 2 The top side of the dispenser 22 may also have a triangular miniature door 9 in the left back corner if looking from the front of the removable dispenser, this can assist drainage for cleaning purposes or even act as a secondary pouring option for pouring thicker shakes mixed in the dispenser, this miniature corner door 9 may open via a push method in which once pushed downward it is released upward on the hinges, or alternatively it can be made to open with a simpler function seen on a battery compartment latch which once release allows the miniature door on hinges to be lifted upward and reside open on the hinges. However, the door may be the full width of the dispenser top side facilitating the same result. The dispenser front wall also has an indicia level gauge 4 for viewing the measurements of liquid for determining servings.

Referring to FIGS. 2 and 10 As mentioned lid member 20 may be provided for covering the top side 22 opening 5 in the dispenser cavity 6. The lid member 20 is selectively positionable in the opening 5 such that the cavity 6 is substantially sealed to prevent splashing of the mixed beverage 40 out of the cavity 6 when the mixing portion 13 is operating.

The lid member 20 of the dispenser may include a handle portion 21 for grasping by a hand of a user. The handle portion 21 may be positioned in a top side 22 of the dispenser 2. The handle portion 21 may have a shape resembling a cow, but may also have shapes of different animals and characters as well.

Referring to FIGS. 4, 9 and 10 A motor drive portion 51 which includes a motor 52 and the coupler/clutch 31 on the upward facing side of the upper partition platform 47. The motor drive 51 may be positioned in the middle section 33 of the housing 30 and may be mounted under the upper partition platform 47. The drive portion 51 and the removable dispenser mixing portion 13 rotate when the drive portion 51 is operated by the control panel 42 and when the drive portion coupler clutch 31 is attached to the dispenser coupling 14 on the underside of the dispenser 2. The mixing portion 13 may include a blade assembly 19, as well known in the industry, and a drive portion 51 includes a motor 52.

Referring to FIGS. 3, 7, 9, 10 and 14 The bracket frame 26 may be attached to the lifting mechanism 41, this bracket frame holding the spoked nozzle 27, lifts the nozzle 27 and spoke 28 to dislodge the weighted cork 18 freeing the aperture 10 of the dispenser 2 bottom wall 15 so that the 1st nozzle and 2nd nozzle become an adjoining channel from the dispenser cavity 6 allowing fluid communication with each other. The bracket frame 26 may be positioned in the second compartment portion 39 of the housing 30 above the removable funnel figurine 53.

The bracket frame 26 attached to the lifting mechanism 41 such that the removable 2nd spoked nozzle 27 which sits within the bracket frame 26, dislodges the weighted cork 18 when the bracket frame is activated to move upwards by the lifting mechanism 41 so that the spoke 28 dislodges the weighted cork 18 and leads to the mixed beverage 40 being selectively receivable from the removable dispenser cavity 6. The frame 26 is attached to a fixture extending out of the lifting mechanism 41. Then when the beverage dispenser 2 is put into the housing 30 unit, the 1st nozzle 12 of the dispenser 2 descends partially into the center of the 2nd T spoked nozzle 27 and the spoke 28 of the 2nd T spoked nozzle 27 points upwards towards the weighted cork 18 of the dispenser, then when the lifting mechanism 41 moves the bracket frame 26 upward for a timed period, the spoke 28 of the T spoked nozzle 27 lifts the weighted cork 18 opening the aperture 10 of the dispenser 2 and dispensing the mixed beverage 40 through the 1st nozzle 12, 2nd spoked nozzle 27, and through the funnel figurine 53 assisting the transference of beverage from the dispenser cavity 6 to the container 38, so that it appears as though the funnel figurine 53 dispenses the mixed beverage 40.

Referring to FIGS. 7, 14 and 15 The T spoked removable nozzle 27 which has square notches that slot into the bracket frame 26 attached to the lifting mechanism 41 may be positioned in the second compartment 39 partially sitting within the removable funnel figurine 53 and may transfer the beverage into the first compartment 37 when the lifting mechanism 41 lifts the bracket frame 26 resulting in the 2nd nozzle spoke 28 dislodging the weighted cork 18.

It will be appreciated that the raising of the weighted cork by the second nozzle could be effected by some other rod or linkage mechanism other than a t-spoke that causes the lifting of the second nozzle to raise the weighted cork without substantially occluding the fluid path through the second nozzle. For example, the second nozzle could include a cranked or right-angle rod. Equally, the weighted cork could include a downwardly extending part that abuts against part of the second nozzle.

When a t-spoke is used, the upper end of the top of the t-spoke does not extended above the bottom wall 15 of the removable dispenser 2 ensures that when the dispenser is not in the dispensing state. This means that the removable dispenser 2 maybe slid out without any parts obstructing the sliding.

The removable funnel figurine 53 may be positioned in the second compartment portion 39. The funnel figurine 53 is put onto a platform 35 above the first compartment 37. The outlet portion 29 of the spoked nozzle 27 slots partially into the funnel figurine 53 and into fixings within the bracket frame 26 by the square notches of the 2nd nozzle 27 which slot into the bracket frame fixing 26.

The container 38 may have a shape resembling a milking bucket, and may have a size for holding approximately one-half pint of liquid. The funnel figurine 53 may resemble a male cow 54, with the outlet portion being located at or adjacent to the udder area of the male cow 54, and the outlet portion may resemble the udder area of the cow.

As well known in the industry, female cows produce milk and male cows do not, however one of the cow characters 54 is male, adding to the novelty and uniqueness of the present invention, this funnel figurine 53 being removable allows for variations of the figurine 53 including a female cow character and other variations of the figurine can be exchanged in its place. The cow figurine 53 may rock slightly from left to right when the shake is being poured by the movement of the nozzle partially residing within the figurine due to slight left right movement manipulation of the bracket frame 26 by the lifting mechanism 41.

Referring to FIGS. 13 and 14 The mouth of the cow funnel figurine 53 may be made to move, due to partial electrical animation of the funnel figurine in coordination with the playing of an audio messages, or in conjunction with the generation of a mooing or bellowing sound.

The mouth of the funnel figurine may have an opening and closing mechanism functioning via an electrical triggering of movement of the mouth due to sound activation of the mechanism of the mouth of the figurine in time with the mooing sound coming from the speakers, powered by a small battery inserted into the removable figurine 53, known to those of ordinary skill in the art.

The removable figurine funnel 53 may have a lid 71 to cover the passage which passes through the funnel figurine 53 on the top side to cover this section when removed from the second compartment platform 35 so that children can play with it as just a figurine separate from the milkshake maker housing 30.

Referring to FIG. 15 The mechanism for producing the movement of the cow rocking slightly from left to right is related to movement of the bracket frame 26 which moves the 2nd nozzle 27 sitting partially within the funnel figurine 53. The lifting mechanism 41 moving in such a way to dislodge the weighted cork 18, and when in the upward position moving slightly left and right to assist the illusion that the cow funnel figurine 53 is moving left to right.

Referring to FIG. 10 A control assembly 42 is located in the interior of the housing for controlling operation of the mixing apparatus 13, variable speed mixing drive portion 51, Led lights 69 and the lifting mechanism 41. The control assembly 42 is electrically coupled to the mixing apparatus 13.

Referring to FIGS. 9 and 10 The variable speed mixing drive portion 51, and the lifting mechanism 41. The control assembly 42 may be positioned in the lower section 34 of the housing 30. The control assembly 42 may include a plurality of switches 55 for selectively mixing and dispensing the mixed beverage 40. Each of the switches 55 may be mounted on the front side 50 of the housing 30 such that each of the switches 55 is accessible to the user.

The control assembly 42 may include an audio apparatus 43 for producing sound. The audio apparatus 43 may include a speaker 56 mounted in the front side 50 of the housing 30. A pre-recorded message may be played upon activation of the control assembly 42. For example, after a shake has been poured, a pre-recorded message may be played that states a pre-recorded message. Of course, the audio apparatus 43 may be turned off so that the apparatus 43 produces no sound. The speaker 56 or an additional speaker may be positioned adjacent to the funnel figurine 53 to create the perception that the sounds are emanating from the funnel figurine 53.

Referring to FIG. 10 A cord member 44 is selectively coupled to a power source for providing electrical power to elements of the invention such as the motor drive 51, speakers 56, lifting mechanism 41, and the control assembly 42. The cord member 44 is electrically coupled to and extends outwardly from the housing 30. The cord member 44 is also electrically coupled to the control assembly 42.

Referring to FIG. 1 A storage compartment 57 for storing drink straws 58 may be provided on the housing 30, such as on the side 62 of the housing 30.

Referring to FIG. 11 The apparatus 1 may also include an integral spillage tray 70 as is well known in the industry, a simple removable molded tray 70 to catch a spill of the shake material that falls on or into, for example, the area shown in FIG. 1, below the first compartment portion 37.

Referring to FIG. 1 The housing 30 may have an indicia 60 marked on an upper portion 61 of the front side 50 of the housing 30. Portions of the indicia 60 may be selectively illuminated during operation of the apparatus 1, as is well known to a person of ordinary skill in the art.

Referring to FIGS. 8, 9 and 10 As a further option, a pull-out Perspex background scene holder 36 behind the removable funnel figurine 53 and in the second compartment platform section 35 may hold a country setting picture, and may be illuminated from above or behind via led lights 69. Further, the various controls on the apparatus 1, such as the various buttons 55 and displays, may also be led illuminated.

Referring to FIG. 12. A small panel 63 can be located on a lower side wall 62 of the housing 30 with an input section for a mic in, for adding to the audio through the speakers, and a headphone socket for muting the sounds to be listened to in the users ears only or for adding speakers to amplify the sound, and having an on off switch for controlling the sound and a volume 67 control.

Referring to FIG. 16 As yet another option, a dust shield may be provided that covers the first 37 and second 39 compartments portions when the apparatus 1 is not in use. The dust shield may be formed of plastic as well known to a person of ordinary skill in the art, and may be transparent such that the ornamentation in the compartments is not blocked from view of the user.

It will be apparent to those of skill in the art, in light of this disclosure, that the functional portions of the apparatus 1 may be removed from the housing 30 and may be incorporated into a refrigerator, such as in the door of the refrigerator, and may also be capable of dispensing milk in its liquid form.

In summary then, the mixing and dispensing apparatus comprises: a housing, which typically has an interior, said interior comprising an upper section, a middle section, and a lower section, said upper section of said interior comprising a cavity for holding the beverage dispenser. This will ideally be a two beverage exit dispenser, one exit for manual pouring and one mechanically activated.

The cavity for holding beverage ingredients in said dispenser contains a mixing apparatus with mixing apparatus blades for blending the beverage ingredients placed in said dispenser cavity of housing, driven by a motor fastened under the mid section platform within the housing which is attached to the dispenser underside couplings by the motor coupler/clutch when dispenser is put into the housing The dispenser has an underside outlet with an attached first nozzle, two elongated legs on the underside of the bottom wall one either side of the aperture closer to each end of the underside, and a slide out (ideally from a small 3 sided plastic molded frame on the bottom wall around the exit aperture) removable (ideally replaceable stainless steel two shafted aperture plate with threading at top center of each shaft to receive screw on stoppers for holding in place a weighted cork, leading to the weighted cork when in place sealing the aperture of the plate and also the aperture of the dispenser bottom wall) weighted plated cork which blocks the outlet, dislodged by a T spoked nozzle (which may for example be molded or 3d printed).

The device operates when the user presses a button, actuating the mechanical gear box. This causes a timed geared lifting mechanism elevates the bracket frame holding and moving the second T-spoked nozzle up, which causes the T-spoke to dislodge the weighted cork allowing beverage to flow from the dispenser outlet and through the first and second nozzle outlet. This second nozzle is ideally concealed by a funnel removable figurine, which channels the beverage to the desired cup section out of the outlet of the removable figurine at the lowest possible exit point to the desired drinking receptacle; therefore, while the second nozzle is raised and lowered, the height present to the user when placing his cup in the beverage dispenser does not change or move, and no moving parts are accessible to users.

While the invention has been described with respect to certain specific embodiments, it will be appreciated that many modifications and changes may be made by those skilled in the art without departing from the spirit of the invention.

It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation.

The assembly and use of the present invention are deemed readily apparent and obvious to one skilled in the art.

The invention claimed is:

1. A beverage dispensing apparatus comprising:
   a housing, including a beverage cavity, a bottom wall and a peripheral wall attached to and extending upwardly from said bottom wall defining an interior, and wherein said housing has an upper partition wall and a lower partition wall each extending between said peripheral wall, said upper partition wall being positioned between an upper section and a middle section, a lower section being positioned between said middle section and said lower partition wall wherein a first compartment protrudes into a front side of said housing into said middle section and extending upwardly from said lower partition wall, a second compartment protruding into said front side into said middle section and being positioned adjacent to and above said first compartment;
   a weighted cork which blocks an outlet from the beverage cavity; a first nozzle extending from the outlet;
   a second nozzle which is moveable in relation to the first nozzle; a lifting bracket attached to or abutting the second nozzle; a lifting mechanism attached to one end of the lifting bracket;
   a t-spoke having a lateral bar extending across the inner diameter of the second nozzle to engage with the side wall of the second nozzle at substantially opposing points, and an axial rod extending upwardly from the lateral bar, and
   a removable funnel located in use in said second compartment, said second nozzle passing into a passage entrance in top of said removable funnel such that it appears as though a mixed beverage is being dispensed from an outlet passage of the removable funnel;

the lifting bracket capable of being raised by the lifting mechanism to raise the second nozzle, causing the t-spoke to dislodge the weighted cork allowing beverage to flow from the outlet and through the first and second nozzles, and thence through the outer funnel, the outer funnel remaining fixed during the movement of the second nozzle.

2. A beverage dispensing apparatus comprising: a beverage dispenser;
a housing, having a cavity for holding the beverage dispenser, a bottom wall and a peripheral wall attached to and extending upwardly from said bottom wall defining an interior, and wherein said housing has an upper partition wall and a lower partition wall each extending between said peripheral wall, said upper partition wall being positioned between an upper section and a middle section, a lower section being positioned between said middle section and said lower section wall wherein a first compartment protrudes into a front side of said housing into said middle section and extending upwardly from said lower partition wall, a second compartment protruding into said front side into said middle section and being positioned adjacent to and above said first compartment, a weighted cork which blocks an outlet from the beverage dispenser; a first nozzle extending from the outlet;
a second nozzle which is moveable in relation to the first nozzle; a lifting bracket attached to or abutting the second nozzle; a lifting mechanism attached to one end of the lifting bracket; a lifting rod; and
a removable funnel located in use in said second compartment, said second nozzle passing into a passage entrance in top of said removable funnel such that it appears as though the mixed beverage is being dispensed from an outlet passage of the removable funnel;
the lifting bracket capable of being raised by the lifting mechanism to raise the second nozzle, causing the lifting rod to dislodge the weighted cork allowing beverage to flow from the outlet and through the first and second nozzles, and thence through the removable funnel, the removable remaining fixed during the movement of the second nozzle.

3. A beverage dispensing apparatus according to claim 2, wherein the lifting bracket is operated in response to the user pressing a button or other control means.

4. A beverage dispensing apparatus according to claim 2, wherein the lifting rod comprises a t-spoke having a lateral bar extending across the inner diameter of the second nozzle to engage with the side wall of the second nozzle at substantially opposing points, and an axial rod extending upwardly from the lateral bar.

5. A beverage dispensing apparatus according to claim 4, wherein the beverage dispenser includes a removable beverage container, and wherein the upper end of the lifting rod is situated beneath a bottom wall of the beverage container when the second nozzle is in the unlifted state.

6. A beverage dispensing apparatus according to claim 2, wherein
the weighted cork is slidably mounted to two guide shafts.

7. A beverage dispensing apparatus according to claim 2, wherein a second fluid exit is provided which allows the beverage to be poured from the beverage dispensing apparatus.

8. A beverage dispensing apparatus according to claim 2, wherein
the beverage dispenser includes a mixing apparatus having blades for blending the beverage positioned in proximity to the weighted cork to urge the beverage through the first nozzle.

9. A beverage dispensing apparatus according to claim 4, wherein the t-spoke extends through an outer wall of the second nozzle, and the lifting bracket fits around the second nozzle to engage with the t-spoke.

10. A beverage dispensing apparatus according to claim 2, further comprising: a small panel located on side of housing, said panel having means for controlling operation of the audio apparatus, with an input section for adding audio for voice or external devices to play audio through the speakers so that the device can be used as an audio input amplifying speaker.

11. A beverage dispensing apparatus according to claim 8, wherein said mixing apparatus comprises a mixing portion and a coupling for receipt by a motor, said mixing portion of dispenser being positioned in said cavity and being located proximate to a top surface of a dispenser bottom wall, said motor being positioned in a housing middle section and being mounted to a housing upper partition platform.

12. The beverage dispensing apparatus according to claim 11, wherein said mixing portion is coupled to connect to a drive portion such that said mixing portion rotates when the motor is operating, said mixing portion comprising a blade assembly.

13. The beverage dispensing apparatus according to claim 2 wherein said lifting mechanism is fluidly attached to said lifting bracket such that the second nozzle held by the lifting bracket is lifted dislodging the weighted cork to selectively dispense mixed beverage from said cavity, said lifting mechanism being positioned in said middle section.

14. The beverage dispensing apparatus according to claim 2, wherein an outlet portion of said second nozzle held in the bracket frame and lifted by said lifting mechanism which is positioned beneath mid section platform and is connected to said lifting bracket positioned above said second compartment assisting transferal of beverage into said first compartment, said outlet portion being lifted by said bracket frame and lifting mechanism, said outlet portion being in fluid communication with said second compartment such that the mixed beverage is transferred from said dispenser cavity to the container when said lifting mechanism is operating and said weighted cork member is dislodged by second nozzle.

15. The beverage dispensing apparatus according to claim 11, wherein
the removable funnel comprises a figurine of a male or female cow.

16. The beverage dispensing apparatus according to claim 11, further comprising: a lid member for substantially covering an opening in said cavity, said lid member being selectively positionable in said opening such that said cavity is substantially sealed to prevent splashing of the beverage ingredients out of said cavity when said mixing apparatus is operating, said lid member including a handle portion for grasping by a hand of a user, said handle portion being positioned in a top side of said lid member.

17. The beverage dispensing apparatus according to claim 16, wherein an outlet portion of said second nozzle held in the lifting bracket and lifted by said lifting mechanism which is positioned beneath mid section platform and is connected to said lifting bracket positioned above said second compartment assisting transferal of beverage into said first compartment, said outlet portion being lifted by said lifting bracket and lifting mechanism, said outlet portion being in fluid communication with said second compartment such that the mixed beverage is transferred from said dispenser cavity to the container when said lifting mechanism is operating and said weighted cork member is dislodged by the second nozzle.

\* \* \* \* \*